US008406522B1

(12) United States Patent
Owechko et al.

(10) Patent No.: US 8,406,522 B1
(45) Date of Patent: Mar. 26, 2013

(54) METHOD FOR FLEXIBLE FEATURE RECOGNITION IN VISUAL SYSTEMS INCORPORATING EVOLUTIONARY OPTIMIZATION

(75) Inventors: Yuri Owechko, Newbury Park, CA (US); Swarup Medasani, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 652 days.

(21) Appl. No.: 12/583,239

(22) Filed: Aug. 17, 2009

(51) Int. Cl.
*G06K 9/00* (2006.01)
(52) U.S. Cl. .................................................. 382/181
(58) Field of Classification Search .................. 382/103, 382/181–231
See application file for complete search history.

(56) References Cited

U.S. PATENT DOCUMENTS

| 5,291,563 A * | 3/1994 | Maeda | 382/103 |
| 2005/0047565 A1 * | 3/2005 | Nassimi | 379/93.05 |

OTHER PUBLICATIONS

Kennedy, J., Eberhart, R. C., and Shi, Y., "Swarm Intelligence," San Francisco: Morgan Kaufmann Publishers, 2001, Chapter 7 ("The Particle Swarm"), pp. 287-318.
Eberhart; Yuhui Shi, "Particle swarm optimization: developments, applications and resources," Proceedings of the 2001 Congress on Evolutionary Computation, 2001, vol. 1, pp. 81-86.
Y. Owechko, S. Medasani, and N. Srinivasa, "Classifier Swarms for Human Detection in infrared imagery," Proc. Of the CVPR worshkops on Object Tracking and Classification Beyond the Visible Spectrum (OTCBVS'04) 2004.
Y. Owechko and S. Medasani, "A Swarm-based Volition/Attention Framework for Object Recognition," IEEE Conference on Computer Vision and Pattern Recognition, San Diego, Proc. Of CVPR-WAPCV 2005.
Y. Owechko and S. Medasani, "Cognitive Swarms for Rapid Detection of Objects and Associations in Visual Imagery," IEEE Swarm Intelligence Symposium, Pasadena, 2005.
P. Saisan, S. Medasani, and Y. Owechko "Multi-View Classifier Swarms for Pedestrian Detection and Tracking," IEEE Conference on Computer Vision and Pattern Recognition, San Diego, 2005.
N. Srinivasa, et al., "Fuzzy edge-symmetry features for enhanced intruder detection," 11th International Conference on Fuzzy Systems, FUZZIEEE 2003.
R. Mendes, "The Fully Informed Particle Swarm: Simpler, Maybe Better," Special issue of IEEE Trans. On Evol. Computation on Particle Swarm Optimization, vol. 8, No. 3, Jun. 2004.
K.E. Parsopoulos, et al, "On the Computation of All Global Minimizers Through Particle Swarm Optimization," Special issue of IEEE Trans. On Evol. Computation on Particle Swarm Optimization, vol. 8, No. 3, Jun. 2004.
F. van der Bergh, et al., "A Cooperative Approach to Particle Swarm Optimization," Special issue of IEEE Trans. On Evol. Computation on Particle Swarm Optimization, vol. 8, No. 3, Jun. 2004.

(Continued)

*Primary Examiner* — Alex Liew
(74) *Attorney, Agent, or Firm* — Tope-McKay & Associates

(57) ABSTRACT

Described is a method for flexible feature adaptation and matching for object recognition in visual systems which incorporates evolutionary optimization. In the present invention, an analysis window is provided to select a portion of an input image to be analyzed for the presence or absence of an object. The analysis window is then divided into spatial regions, and a feature kernel function for each spatial region is selected and optimized. A feature value for each spatial region is calculated by finding a suitable location that generates the best matching features to a stored set using an optimization algorithm. The feature values are concatenated for the spatial regions to comprise a feature vector. Finally, the feature vector is processed by a classification algorithm, and a determination is made whether the object is present in the analysis window.

21 Claims, 8 Drawing Sheets

OTHER PUBLICATIONS

A. Ratnaweera, "Self-Organizing hierarchical particle Swarm Optimizer with Time-Varying Acceleration Coefficients," Special issue of IEEE Trans. On Evol. Computation on Particle Swarm Optimization, vol. 8, No. 3, Jun. 2004.

C.A. Coelle, "Handling Multiple Objectives With Particle Swarm Optimization," Special issue of IEEE Trans. On Evol. Computation on Particle Swarm Optimization, vol. 8, No. 3, Jun. 2004.

L. Messerschmidt, et al., "Learning to Play Games Using a PSO-Based Competitive Learning Approach," Special issue of IEEE Trans. On Evol. Computation on Particle Swarm Optimization, vol. 8, No. 3, Jun. 2004.

R. Hassan, B. Cohanim, and O. de Weck, "A Comparison of Particle Swarm Optimization and the Genetic Algorithm," AIAA Conference, 2005.

J.F. Schutte, J.A. Reinbolt, B.J. Fregly, R.T. Haftka, and A.D. George, "Parallel Global Optimization with the Particle Swarm Algorithm," Int. J. Numerical methods in Engineering. 81:2296-2315, 2004.

J. Kennedy and W.M. Spears, "Matching Algorithms to Problems: An Experimental Test of the Particle Swarm and Some Genetic Algorithms on the Multimodal Problem Generator," Proceedings of the IEEE Inter Conf. on Evolutionary Computation, 78-83, 1998.

Lazebnik, S., C. Schmid, et al. (2006), "Beyond bags of features: Spatial pyramid matching for recognizing natural scene categories," IEEE Conference on Computer Vision and Pattern Recognition, New York, NY.

Lowe, D. (1999), "Object recognition from local scale-invariant features," International Conference on Computer Vision, Corfu, Greece.

Medasani, S. and Y. Owechko (2007), "Behavior recognition using cognitive swarms and fuzzy graphs," SPIE Defense and Security Symposium, Orlando, FL.

S. Medasani, and Y. Owechko, "Possibilistic Particle Swarms for Optimization," Proceedings 5673 of SPIE/IST Symposium on Electric Imaging, San Jose, 2005.

\* cited by examiner

METHOD FOR FLEXIBLE FEATURE RECOGNITION IN VISUAL SYSTEMS INCORPORATING EVOLUTIONARY OPTIMIZATION

BACKGROUND OF THE INVENTION (1) Field of Invention

The present invention relates to a method for flexible feature matching for object recognition in visual systems and, more particularly, to a method for flexible feature recognition in visual systems which incorporates evolutionary optimization.

(2) Description of Related Art

Feature matching is a process which involves matching feature points extracted from a sensed image to complementary points in a reference image. In existing approaches to feature matching, the features are defined as part of the classifier development or training process. Once the classifier is trained, the features become fixed or rigid in that they do not change or adapt to the input image. Biological vision systems do not have such rigidity. For example, humans recognize a car as a car even if parts of the car are displaced or rotated slightly with respect to each other. Existing computer vision systems must learn to handle such variations through training sets that include large numbers of variations. A human can generalize immediately without needing to see many such examples, in part, because of the flexible manner in which features are recognized. However, because existing computer vision systems must use large training sets, they are inflexible and generally less efficient.

Thus, a continuing need exists for a method for feature matching for object recognition that is flexible in the feature recognition or matching process and which results in better generalization without the requirement for large training sets to cover the range of possible variations.

SUMMARY OF THE INVENTION

The present invention relates to a method for flexible feature matching for object recognition in visual systems. The method includes several steps or acts, such as providing an analysis window, wherein the analysis window is defined to select a portion of an input image to be analyzed for the presence or absence of an object. The analysis window is then divided into a plurality of spatial regions. During a previous training process an appropriate feature kernel function is selected and optimized for each spatial region using an optimization algorithm. During the use of the proposed system, a feature value is calculated for each spatial region, wherein the feature value represents a inner product of the spatial region with the corresponding feature kernel function, a feature matching score is then computed between features extracted from spatial region in the analysis window and a set of stored features corresponding to that spatial region. An optimization algorithm is used to find the location that generates features that best match the stored ones for that corresponding spatial region. Once the best matching features for a spatial region are found, the feature values for the plurality of spatial regions are concatenated to comprise a feature vector. The feature vector is then processed by a classification algorithm. Finally, a determination is made regarding whether the object is present in the analysis window.

In another aspect, the classification algorithm is a neural network statistical classifier.

In yet another aspect, the feature value is the inner product of the kernel function for each spatial region with the portion of the input image that overlaps the kernel function.

In another aspect, the feature kernel function comprises a plurality of parameters.

In yet another aspect, the present invention further comprises the act of automatically adjusting the plurality of parameters using the evolutionary optimization algorithm.

In another aspect, the evolutionary optimization algorithm is a particle swarm optimization algorithm.

In another aspect, the evolutionary optimization algorithm is a genetic algorithm.

As can be appreciated by one skilled in the art, the present invention also comprises a computer program product. The computer program product includes instruction means that are executable by a computer to cause the computer to perform the method described herein.

Finally, as can be appreciated by one skilled in the art, the present invention also includes a system comprising one or more processors that are configured to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
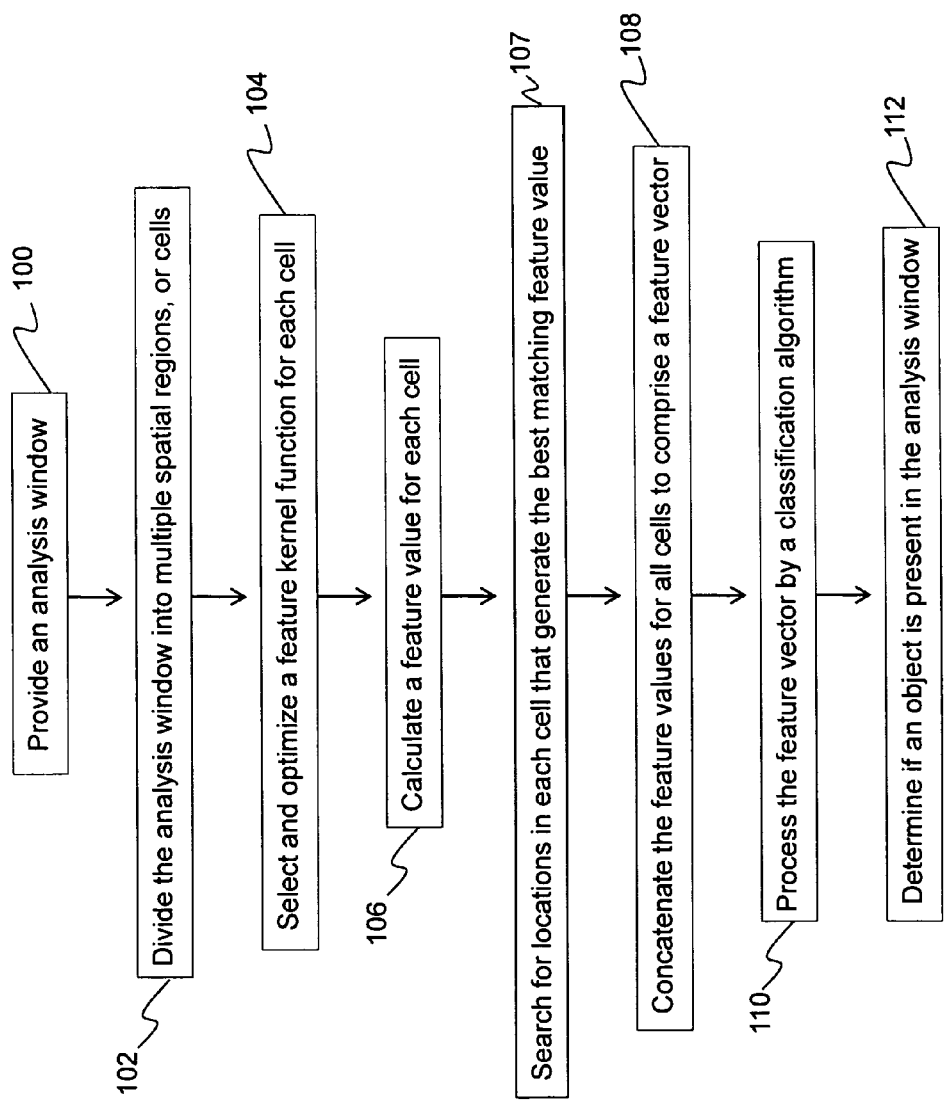
FIG. 1 shows the method for flexible feature matching for object recognition in visual systems according to the present invention.

The present invention relates to a method for flexible feature matching for object recognition in visual systems and, more particularly, to a method for flexible feature recognition in visual systems which incorporates evolutionary optimization. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) PRINCIPAL ASPECTS

The present invention has three "principal" aspects. The first is a system for flexible feature matching for object recognition in visual systems. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for flexible feature matching for object recognition in visual systems, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. These aspects will be described in more detail below.

(2) INTRODUCTION

In existing approaches to feature matching, the features are defined as part of the classifier development or training process. Once the classifier is trained, the features become fixed or "rigid" in that they do not change or adapt to the input image. Biological vision systems do not have such rigidity. For example, humans recognize a car as a car even if features of the car are displaced or rotated slightly with respect to each other. Some models of biological vision use a "winner-take-all" mechanism to select features from a small set of possibilities. However, unlike the invention described herein, they do not provide an efficient mechanism to adapt features over multiple dimensions. Other non-biological computer vision systems must learn to handle such variations by training with many examples of such variations. A human can generalize immediately without needing to see many such examples, in part, because of the flexible manner in which features are generated. An advantage of the present invention is that it allows computer vision systems to have flexibility in the feature generation, matching, and the final recognition process by using an evolutionary optimization method, which results in generalization without the need for large training sets to cover the range of possible feature variations.

By using evolutionary optimization methods such as particle swarm optimization (PSO) for object recognition in visual systems, features are adapted locally to the input image during recognition. Additionally, features are adapted over multiple dimensions efficiently. PSO has unique attributes which makes it especially suitable for feature selection and optimization. A significant advantage is the simple and natural way that candidate solutions are represented as points in a separable space. This allows almost any feature to be represented and provides great flexibility in specifying regions of the solution space to be explored. Another advantage is PSO's superior performance due to its good balancing of cooperation and competition which arises from the use of swarm intelligence principles. Finally, the algorithm described in the present application can be implemented very efficiently on parallel processors.

The present invention relates to a method for flexible feature matching for object recognition in visual systems which incorporates evolutionary optimization. The present invention can be used to improve performance and add capabilities to a wide variety of vision systems, non-limiting examples of which include automotive and commercial vision systems. The invention described herein is applicable to broad areas of automotive safety, non-limiting examples of which include back-up warning and pre-crash sensing systems. Factory automation, force protection, and automatic target recognition are additional non-limiting examples of applications for the present invention.

The conventional processing flow for recognition of objects in images or video using computer vision consists of three stages. In the first stage, an analysis window is defined to select the portion of the input image that is to be analyzed for the presence or absence of a target object. The analysis window is scanned or otherwise positioned at various locations in the image in order to find objects. In the second stage, features are extracted from a spatial region in the analysis window using a predefined kernel that has been selected for that spatial region during the training phase. A common type of feature value is the inner-product of the analysis window with a two-dimensional (2D) kernel function. The feature values are actually extracted by searching for a location, using an optimization algorithm, within the spatial region that generates features that best match the stored signature features for the corresponding spatial region. A common type of matching score is the inner-product of the two feature value sets. A set of feature values from different spatial regions in the analysis window, each of which may use a different kernel function, are combined into a feature vector. The third stage consists of the classification of the feature vector as representing a target or non-target object. This invention provides a method for automating the selection of features for the second stage.

(3) SPECIFIC DETAILS

As described above, a common type of matching score is the inner-product of the analysis window with a 2D kernel function. Typically, the kernels used for feature calculations are defined as part of the classifier development or training process. After training, the features do not change and hence are "rigid." A purpose of this invention is to provide a method for adapting the features over a limited range to the input image during the recognition process.

Figure 2:
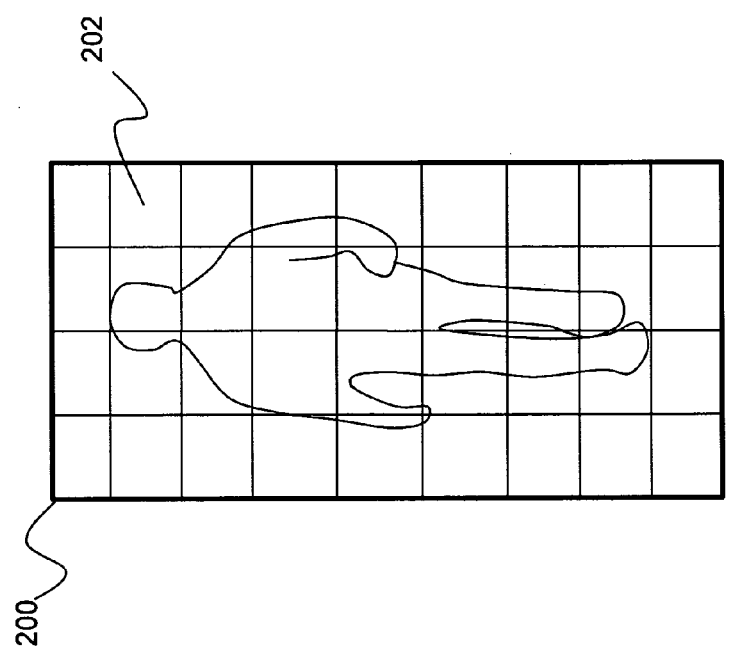
FIG. 2 depicts an analysis window divided into multiple spatial regions according to the present invention.

FIG. 1 illustrates the method for flexible feature matching for object recognition in visual systems. An analysis window is provided 100 and then divided into spatial regions 102, or cells. A nominal feature kernel function is selected and optimized for each cell during the classifier development process 104. A feature value is then calculated for each cell 106. As a non-limiting example, the feature value for each cell is given by the inner product of the kernel function for that cell with the portion of the image that overlaps the kernel. Then an optimization algorithm is used to find the location that generates features that best match the stored ones for that corresponding spatial region 107. Once the best matching features for a spatial region are found, the feature values for the plurality of spatial regions are concatenated to comprise a feature vector 108. Finally, the feature vector is processed by a classification algorithm 110 to determine if the target object is present in the analysis window 112. In a desired aspect, the classification algorithm is a neural network statistical classifier. Additional non-limiting examples of statistical classifiers which may be used in the present invention include decision trees, support vector machines, and Bayesian belief networks. FIG. 2 depicts an analysis window 200 divided into multiple spatial regions 202, or cells.

Figure 3:
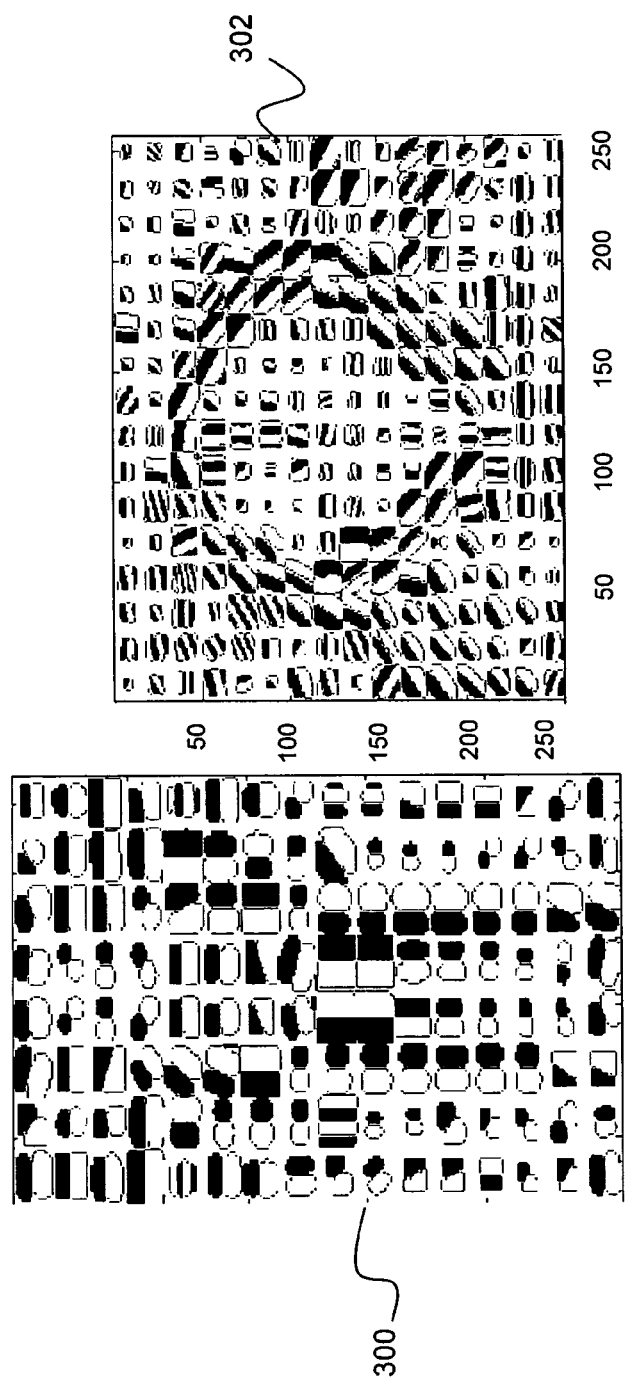
FIG. 3 is an illustration depicting an example of thresholded Gabor wavelets.

Non-limiting examples of kernel functions used for illustration of the method include the extended Haar and thresholded Gabor wavelets. For the purposes of this application, "kernel" and "wavelet" are interchangeable. FIG. 3 illustrates an example of thresholded Gabor wavelets optimized for humans 300 and human heads 302. These kernel functions have various parameters that control their properties, non-limiting examples of which include location, size, orientation, and shape. The present invention comprises a method for automatically adjusting these parameters during recognition to optimize the features for matching the target image. A variety of optimization algorithms may be used to adjust the parameters of the features in order to maximize the matching score. A unique feature of the present invention is the use of an evolutionary optimization algorithm, such as PSO, to maximize the feature matching score or metric.

Generally speaking, PSO is a relatively simple evolutionary optimization method that has its roots in the modeling of the behavior of groups of biological organisms. Examples of such groups include bird flocks or bee swarms as described by Kennedy et al. in "Swarm Intelligence", San Francisco: Morgan Kaufmann Publishers, 2001, and by Eberhart and Shi in "Particle Swarm Optimization: Developments, Applications, and Resources", 2001. Conceptually, PSO includes aspects of genetic algorithms and evolutionary programming. A solution space is first defined where each location in this multi-dimensional space represents a potential problem solution. A group or swarm of software agents, or particles, is then used to explore the solution space and find optimized solutions. The particles are initialized with random positions and velocities. As the swarm evolves, each particle keeps track of its coordinates in solution space that are associated with the best solution (p) it has observed so far. A global best parameter ($p_g$) is used to store the best location among all particles. The velocity of each particle is then changed towards p and $p_g$ in a probabilistic way according to:

$$v_i(t+1) = wv_i(t) + c_1\phi_1[p_i(t) - x_i(t)] + c_2\phi_2[p_g(t) - x_i(t)]$$

$$x_i(t+1) = x_i(t) + \chi v_i(t+1)$$

where $x_i(t)$ and $v_i(t)$ are the position and velocity vectors at time t of the i-th particle and $c_1$ and $c_2$ are parameters that weight the influence of their respective terms in the velocity update equation. w is a decay constant which allows the swarm to converge to a solution more quickly. $\phi_i$ and $\phi_2$ are random numbers between 0 and 1 with a uniform distribution. Finally, $\chi$ is a constriction factor which also influences the convergence of PSO.

The random element introduces a source of noise which enables an initial random search of the solution space. The search then becomes more directed after a few iterations as the swarm starts to concentrate on more favorable regions. This type of search is much more efficient than brute force search or gradient based search methods. It is similar to genetic algorithms in that it can be used for discontinuous and noisy solution spaces since it only requires an evaluation of the function to be optimized at each particle position. No gradient information is used. Unlike genetic algorithms, the PSO particles are not modified at each iteration. The particles just travel to a different position, calculate the solution at that position, and compare it with their own and global best value in order to update their velocity vectors.

PSO relies on the fact that in most practical problems, the optimum solution usually has better than average solutions residing in a volume around it. These good solutions tend to attract the particles to the region where the optimum lies. The swarm becomes more and more concentrated until the optimum is found (e.g. $p_g$ no longer changes). Using PSO, it has been found experimentally that the number of particles and iterations required scale weakly with the dimensionality of the solution space. The total number of function evaluations is very small compared to the size of the solution space. As noted above, PSO can be used to maximize the feature matching score, or metric, which will be described in further detail below.

Figure 4:
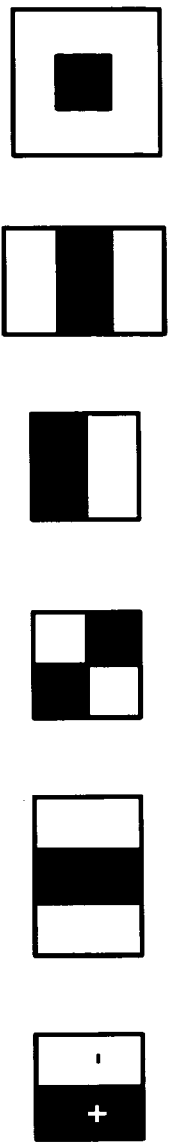
FIG. 4 is an illustration depicting several types of generalized Haar-like wavelets.

FIG. 4 illustrates different kernels that may be used with the present invention. Specifically, FIG. 4 depicts several types of generalized Haar-like wavelets 400. The wavelet values are limited to $\{-1, +1\}$. The four wavelet parameters optimized using PSO include x-location within the cell, y-location within the cell, wavelet type, and wavelet size.

Thresholded Gabor wavelets are defined according to:

$$\text{Type 1:} \quad G(x, y) = \exp\left(-\frac{(X^2 + \gamma Y^2)}{2\sigma^2}\right)\cos\left(\frac{2\pi}{\lambda}X\right)$$

$$\text{Type 2:} \quad G(x, y) = \exp\left(-\frac{(X^2 + \gamma Y^2)}{2\sigma^2}\right)\sin\left(\frac{2\pi}{\lambda}X\right)$$

where $X = x\cos\theta + y\sin\theta$
$Y = -x\sin\theta + y\cos\theta$

Thresholded Wavelets: $G_{TH}(x, y) = \begin{cases} 1 & \text{if } G(x, y) >= tval \\ 0 & \text{if } -tval < GI(x, y) < tval \\ -1 & \text{if } G(x, y) < -tval \end{cases}$ The wavelet values are limited to {−1, 0, 1}. The featured parameters optimized using PSO include x location in cell, y location in cell, θ, γ, σ, λ, tval, wavelet type, and wavelet window size. λ represents the spatial wavelength of the cosine factor, θ represents the orientation of the wavelet, φ denotes the phase offset, σ denotes the size of the Gaussian envelope, and γ represents the spatial aspect ratio and specifies the ellipticity of the support of the Gabor function. The parameter tval is a threshold value which determines the transition between values of 1, 0, and −1 and controls how the continuously-valued version of the Gabor wavelet is converted into a thresholded version that assumes values of −1, 0, or 1 only. The thresholded Gabor wavelet $G_{TH}$ has computational advantages because multiplication is not required to calculate the feature values. All of the adjustable parameters in the above equation are optimized for high recognition rate during the classifier development process.

Figure 5B:
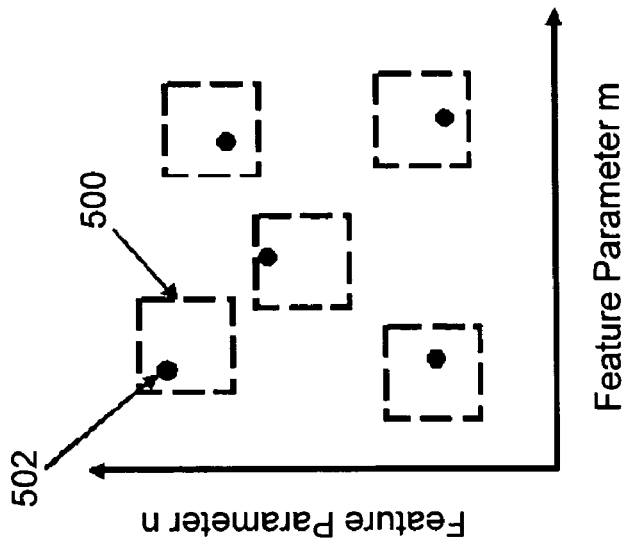
FIG. 5B is a plot chart illustrating flexible features according to the present invention.
Figure 5A:
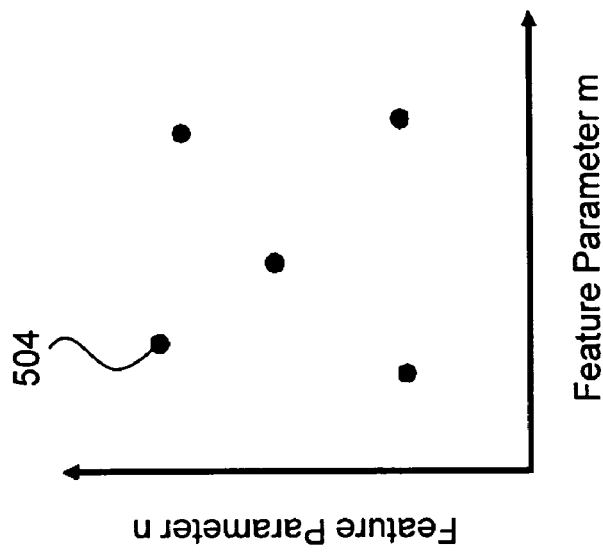
FIG. 5A is a plot chart illustrating conventional features.

A comparison of conventional and flexible features is illustrated in FIGS. 5A and 5B, respectively. The present invention defines a volume of possible features centered on each nominal feature defined during training. As shown in FIG. 5B, these separate sets of possible features are represented as hyper-volumes, or feature cells 500 in multidimensional feature parameter space. The final feature 502 in each cell is selected during recognition by optimizing the feature matching metric using an evolutionary optimization algorithm, such as PSO. The use of flexible features makes the recognition process more robust and tolerant to variations in the input image. By defining ranges of possible parameter values during training instead of precise values, the features can be made more robust and flexible. As described previously, non-limiting examples of feature parameters include position, size, and rotation. In contrast and as shown in FIG. 5A, conventional features 504 are rigid in that they are fixed during the classifier development or training process and do not change during the recognition process. Conventional features 504 are limited to fixed parameter values.

The flexible feature matching process is used to create a vector of feature matching scores or values for use in object recognition. Machine learning algorithms that use statistical classifiers, such as decision trees or neural networks, are trained to recognize the feature vector as being generated by a member of a specified object class. Conventional feature matching measures the degree of match between a fixed template or kernel and a local image region. If the template is fixed, then small changes in the local image region can result in large changes in the feature matching value, which makes the statistical object classifier less robust to variations in the object. By performing an optimization over the feature template parameters to maximize the matching score, the template or kernel can be adjusted over a limited range of parameter values to best match the local image region, resulting in flexible feature matching that adapts to small changes in the object image. This allows the object recognition process to generalize better by being tolerant of small changes in the object.

Figure 6:
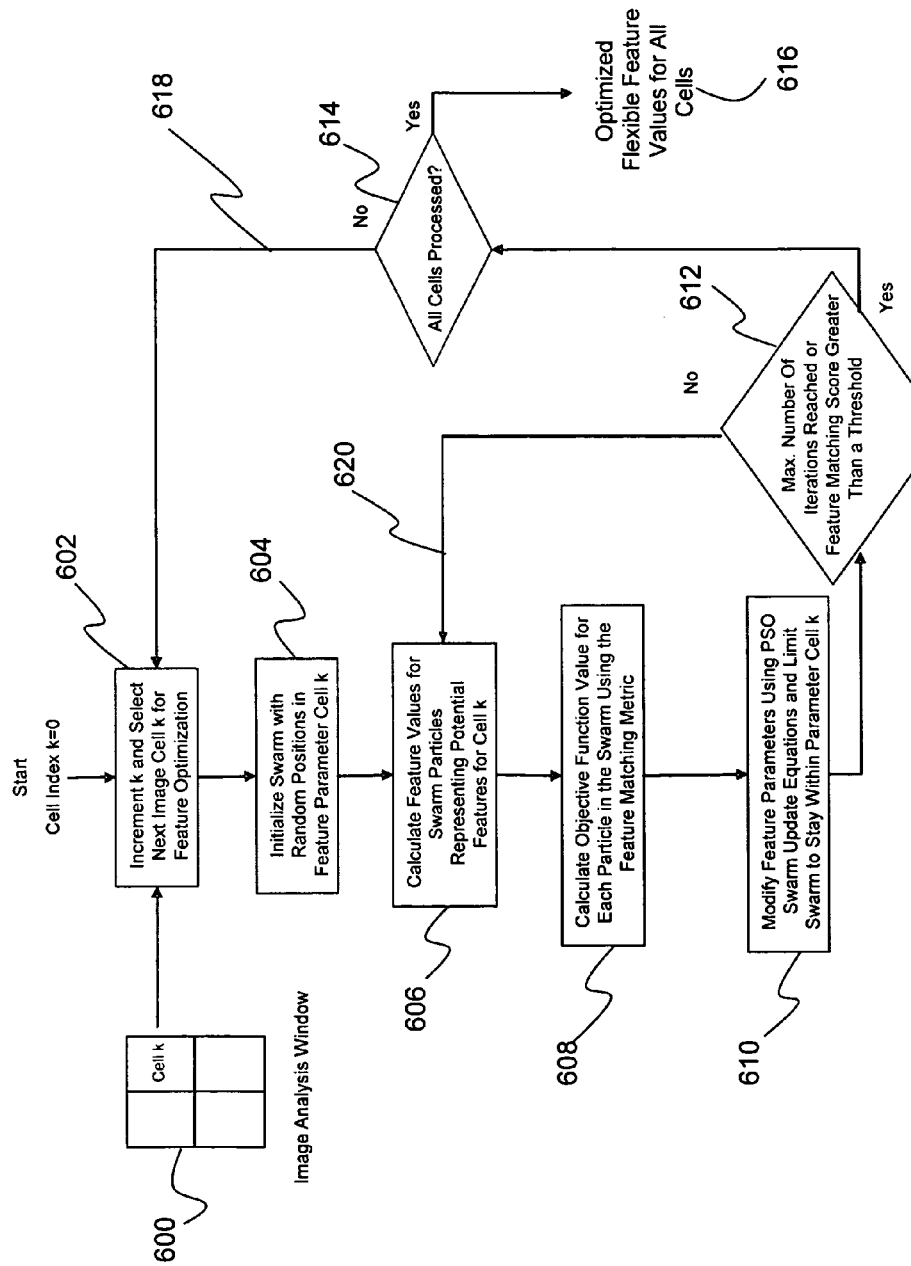
FIG. 6 illustrates the method for flexible feature adaptation and matching for object recognition using Particle Swarm Optimization according to the present invention.

FIG. 6 illustrates the method for flexible feature adaptation and matching for object recognition using PSO. An image analysis window k 600 is incremented, and the next image cell k is selected for feature optimization 602. Next, a swarm is initialized with random positions in feature parameter cell k 604. Feature values for swarm particles representing potential features for cell k are then calculated 606. An objective function value for each particle in the swarm is calculated using the feature matching metric 608. Next, feature parameters are modified using PSO swarm update equations, and the swarm is limited to stay within parameter cell k 610. The algorithm then determines if a maximum number of iterations (that can be empirically derived from the data and the type of object being detected) has been reached or if a feature matching score greater than a determined threshold is reached 612. If a maximum has not been reached, feature values for swarm particles representing potential features for cell k are calculated 606 again. If a maximum has been reached, or the feature matching score is greater than an empirically derived threshold, the algorithm determines whether all of the cells have been processed 614. If all cells have not been processed, image analysis window k 600 is incremented again to select the next image cell k for feature optimization 602. If all cells have been processed, optimized flexible feature values for all cells are obtained 616. The algorithm consists of two nested loops, an outer loop 618 and an inner loop 620. The outer loop 618 steps through all of the cells in the analysis window k 600, while the inner loop 620 steps through multiple iterations or updates of the PSO particle positions in order to determine the optimum feature parameter values in each cell.

As described previously, genetic algorithms may also be used as the optimization framework in place of PSO. However, genetic algorithms lack many of the advantages of PSO such as the simple direct representation of solutions, separability of the solution space, and the balancing between cooperative and competitive solution selection mechanisms.

Figure 7:
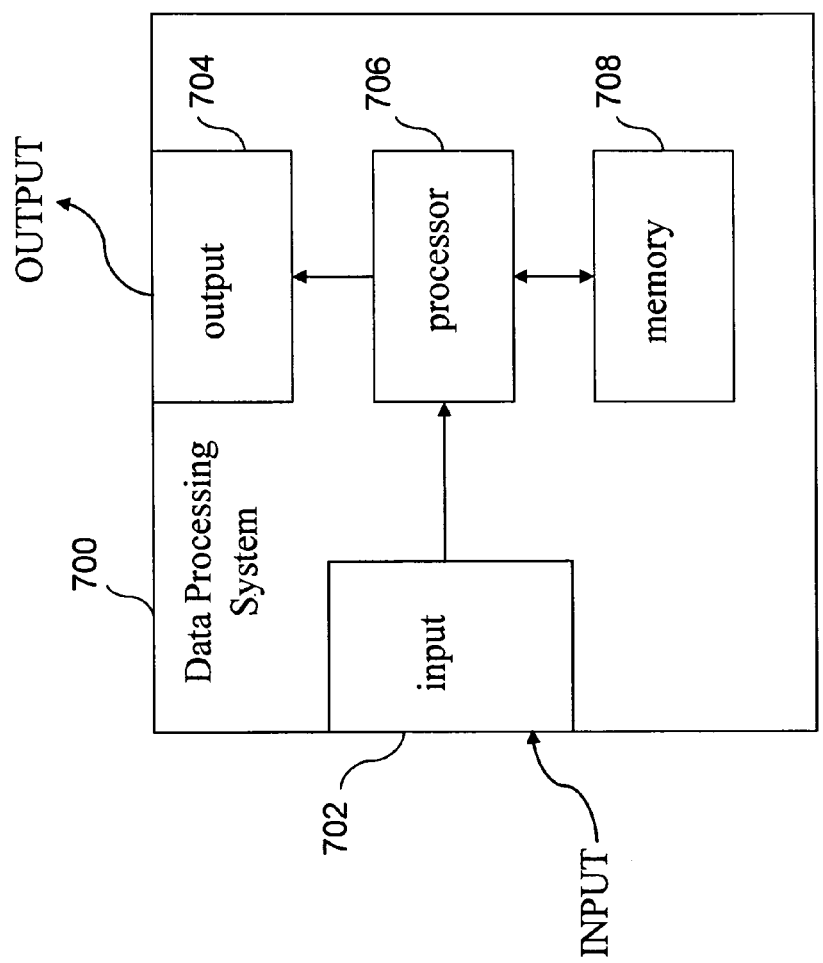
FIG. 7 is an illustration of a data processing system according to the present invention.

FIG. 7 illustrates a block diagram depicting components of a data processing system 700 (e.g., computer) incorporating the operations of the method described above. The method utilizes a data processing system 700 for storing computer executable instructions for causing a processor (or processors) to carry out the operations of the above described method. The data processing system 700 comprises an input 702 for receiving information from a user. Information received may include input from devices such as cameras, scanners, keypads, keyboards, microphone, other peripherals such as storage devices, other programs, etc. The input 702 may include multiple "ports." An output 704 is connected with a processor 706 (or processors) for providing information for transmission to other data processing systems, to storage devices, to display devices such as monitors, to generating information necessary for delivery, and to other mechanisms for presentation in user-usable forms. The input 702 and the output 704 are both coupled with the processor 706, which may be a general-purpose computer processor or a specialized processor designed specifically for use with the present invention. The processor 706 is coupled with a memory 708 to permit storage of data and software to be manipulated by commands to the processor 706.

Figure 8:
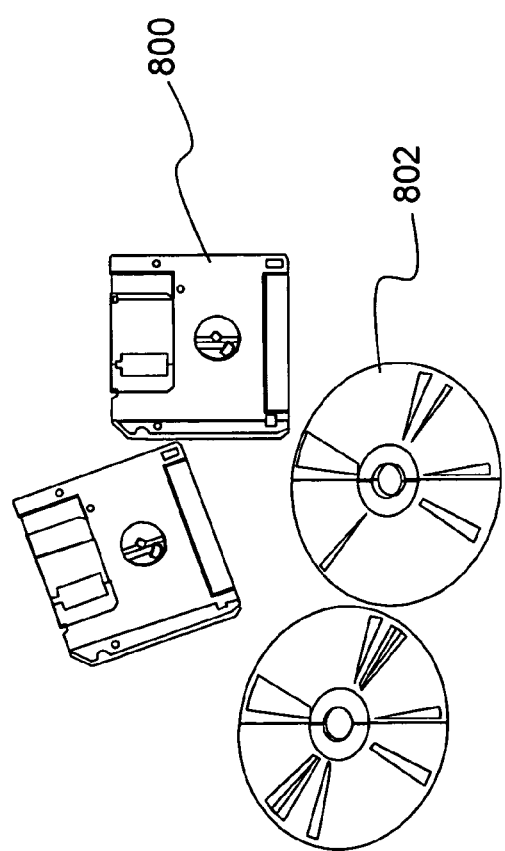
FIG. 8 is an illustration of a computer program product according to the present invention.

An illustrative diagram of a computer program product embodying the present invention is depicted in FIG. 8. As a non-limiting example, the computer program product is depicted as either a floppy disk 800 or an optical disk 802. However, as mentioned previously, the computer program product generally represents computer readable code stored on any compatible computer readable medium.

What is claimed is:

1. A computer-implemented method for flexible feature matching for object recognition in visual systems, the method comprising an act of causing a processor to perform operations of:
 providing an analysis window, wherein the analysis window is defined to select a portion of an input image to be analyzed for the presence of an object;
 dividing the analysis window into a plurality of spatial regions;
 selecting and optimizing a feature kernel function for each spatial region;
 calculating a plurality of feature values for each spatial region using an optimization algorithm, wherein the feature values represent a matching score between a set of features extracted from the analysis window and a set of stored features;
 wherein the feature values computed from a location in the spatial region best match a set of stored features corresponding to that spatial region;
 concatenating the feature values for the plurality of spatial regions to comprise a feature vector;
 processing of the feature vector by a classification algorithm; and
 determining if the object is present in the analysis window.

2. The method for flexible feature matching for object recognition as set forth in claim 1, wherein the classification algorithm is a neural network statistical classifier.

3. The method for flexible feature matching for object recognition as set forth in claim 2, wherein a portion of the input image overlaps the kernel function, and wherein the feature value is an inner product of the kernel function for each spatial region with the portion of the input image that overlaps the kernel function.

4. The method for flexible feature matching for object recognition as set forth in claim 3, wherein the feature kernel function comprises a plurality of parameters.

5. The method for flexible feature matching for object recognition as set forth in claim 4, further comprising the act of automatically adjusting the plurality of parameters using an evolutionary optimization algorithm.

6. The method for flexible feature matching for object recognition as set forth in claim 1, wherein the optimization algorithm is a particle swarm optimization algorithm.

7. The method for flexible feature matching for object recognition as set forth in claim 1, wherein the optimization algorithm is a genetic algorithm.

8. A computer program product for flexible feature matching for object recognition in visual systems, comprising computer-readable instruction means stored on a non-transitory computer-readable medium that are executable by a computer having a processor for causing the processor to perform operations of:
 providing an analysis window, wherein the analysis window is defined to select a portion of an input image to be analyzed for the presence of an object;
 dividing the analysis window into a plurality of spatial regions;
 selecting and optimizing a feature kernel function for each spatial region;
 calculating a feature value for each spatial region using an optimization algorithm, wherein the feature value represents a matching score between a set of features extracted from the analysis window and a set of stored features;
 wherein the feature values computed from a location in the spatial region best match a set of stored features corresponding to that spatial region;
 concatenating the feature values for the plurality of spatial regions to comprise a feature vector;
 processing of the feature vector by a classification algorithm; and
 determining if the object is present in the analysis window.

9. The computer program product for flexible feature matching for object recognition as set forth in claim 8, wherein the classification algorithm is a neural network statistical classifier.

10. The computer program product for flexible feature matching for object recognition as set forth in claim 9, wherein a portion of the input image overlaps the kernel function, and wherein the feature value is an inner product of the kernel function for each spatial region with the portion of the input image that overlaps the kernel function.

11. The computer program product for flexible feature matching for object recognition as set forth in claim 10, wherein the feature kernel function comprises a plurality of parameters.

12. The computer program product for flexible feature matching for object recognition as set forth in claim 11, further comprising instruction means for automatically adjusting the plurality of parameters using an evolutionary optimization algorithm.

13. The computer program product for flexible feature matching for object recognition as set forth in claim 8, wherein the optimization algorithm is a particle swarm optimization algorithm.

14. The computer program product for flexible feature matching for object recognition as set forth in claim 8, wherein the optimization algorithm is a genetic algorithm.

15. A system for flexible feature matching for object recognition in visual system, the system comprising one or more processors that are operable for performing operations of:
 providing an analysis window, wherein the analysis window is defined to select a portion of an input image to be analyzed for the presence of an object;
 dividing the analysis window into a plurality of spatial regions;
 selecting and optimizing a feature kernel function for each spatial region;
 calculating a feature value for each spatial region using an optimization algorithm, wherein the feature value represents a matching score between a set of features extracted from the analysis window and a set of stored features;
 wherein the feature values computed from a location in the spatial region best match a set of stored features corresponding to that spatial region;
 concatenating the feature values for the plurality of spatial regions to comprise a feature vector;
 processing of the feature vector by a classification algorithm; and
 determining if the object is present in the analysis window.

16. The system for flexible feature matching for object recognition as set forth in claim 15, wherein the classification algorithm is a neural network statistical classifier.

17. The system for flexible feature matching for object recognition as set forth in claim 16, wherein a portion of the input image overlaps the kernel function, and wherein the feature value is an inner product of the kernel function for each spatial region with the portion of the input image that overlaps the kernel function.

18. The system for flexible feature matching for object recognition as set forth in claim 17, wherein the feature kernel function comprises a plurality of parameters.

19. The system for flexible feature matching for object recognition as set forth in claim 18, automatically adjusting the plurality of parameters using an optimization algorithm.

20. The system for flexible feature matching for object recognition as set forth in claim 15, wherein the optimization algorithm is a particle swarm optimization algorithm.

21. The system for flexible feature matching for object recognition as set forth in claim 15, wherein the optimization algorithm is a genetic algorithm.

* * * * *